United States Patent

Cookson

[11] 4,095,040
[45] June 13, 1978

[54] GAS INSULATED TRANSMISSION LINE HAVING LOW INDUCTANCE INTERCALATED SHEATH

[75] Inventor: Alan H. Cookson, Southboro, Mass.

[73] Assignee: Westinghouse Electric Corp., Pittsburgh, Pa.

[21] Appl. No.: 740,445

[22] Filed: Nov. 10, 1976

[51] Int. Cl.² ............................................. H01B 9/02
[52] U.S. Cl. ..................................... 174/28; 174/16 B; 174/108
[58] Field of Search ................. 174/28, 108, 29, 16 B, 174/99 B, 36, 102 R

[56] References Cited

U.S. PATENT DOCUMENTS

| 2,070,678 | 2/1937 | Odarenko | 174/28 X |
| 2,922,835 | 1/1960 | Lehr | 174/108 X |
| 3,515,793 | 6/1970 | Aupoix et al. | 174/108 X |
| 3,610,947 | 10/1971 | Stephanides et al. | 174/28 X |
| 3,792,191 | 2/1974 | Perry et al. | 174/28 X |
| 3,814,832 | 6/1974 | Cronin | 174/28 |

FOREIGN PATENT DOCUMENTS

| 144,149 | 9/1948 | Australia | 174/108 |
| 672,125 | 2/1939 | Germany | 174/28 |
| 75,451 | 11/1946 | Norway | 174/28 |
| 580,944 | 9/1946 | United Kingdom | 174/28 |
| 685,532 | 1/1953 | United Kingdom | 174/108 |

Primary Examiner—Arthur T. Grimley
Attorney, Agent, or Firm—M. S. Yatsko

[57] ABSTRACT

A gas insulated transmission line including an outer sheath, an inner conductor disposed within the outer sheath, and an insulating gas between the inner conductor and the outer sheath. The outer sheath comprises an insulating tube having first and second ends, and having interior and exterior surfaces. A first electrically conducting foil is secured to the interior surface of the insulating tube, is spirally wound from one tube end to the second tube end, and has a plurality of overlapping turns. A second electrically conducting foil is secured to the exterior surface of the insulating tube, and is spirally wound in the opposite direction from the first electrically conducting foil. By winding the foils in opposite directions, the inductances within the intercalated sheath will cancel each other out.

8 Claims, 2 Drawing Figures

GAS INSULATED TRANSMISSION LINE HAVING LOW INDUCTANCE INTERCALATED SHEATH

BACKGROUND OF THE INVENTION

The Government has rights in this invention pursuant to Contract No. E(49-18)-2061 awarded by the United States Energy Research and Development Administration.

This invention relates generally to gas insulated transmission lines, and more particularly to such a line having an intercalated sheath with foils being spirally wound in opposite directions.

In compressed gas insulated transmission lines, the cost of the outer sheath, which is typically aluminum, is a substantial part of the total material cost of the entire line. For example, for a 1200 kV system, the cost of the outer sheath is approximately 40% of the total material cost.

One means utilized for reducing the substantial sheath cost is not to use a solid metal, but instead to use a non-metallic material. However, such use of non-metallic material results in design problems in that the interior surface of the outer sheath, that is, the surface nearest the inner conductor, must be grounded. This design problem can be overcome by applying a metallic layer on the interior surface of the outer sheath to which ground connections can be made. One method of applying this layer is to use a spiral wound foil system wherein each turn is insulated from the next turn. This is termed an intercalated sheath.

In practice, however, it may be desirable to use intercalated foils on both the inside and outside of the nonmetallic sheath material. The inner foil is necessary to act as an electrostatic screen, while the outer foil is utilized to prevent moisture from migrating into the system from outside.

As previously stated, the intercalated sheath must be electrically grounded. The maximum length between ground connections is determined by the maximum permissible voltage rise present under steady-state operating conditions. It is economically advantageous to make the distance between adjacent grounds as large as possible. The inductance of the intercalated sheath plays an important role in the voltage rise present, and this voltage rise increases with increasing inductance. Therefore, it is desirable to provide an intercalated sheath which minimizes the effective inducatance present.

SUMMARY OF THE INVENTION

The aforementioned minimization is accomplished by this invention by providing a gas insulated transmission line having an outer sheath and an inner conductor disposed within the sheath. An insulating gas is disposed between the inner conductor and the outer sheath to electrically insulate the inner conductor. The outer sheath comprises a insulating tube having first and second ends and interior and exterior surfaces. A first electrically conducting foil is secured to the interior surface of the insulating tube. The first foil is spirally wound from the first tube end and to the second tube end, and has a plurality of overlapping turns. A second electrically conducting foil is secured to the insulating tube, with this second foil being spirally wound from the second tube end to the first tube end and electrically insulated from the first foil. By so winding the first and second foils in opposite directions, the inductance of the two foils effectively cancel each other out, thereby minimizing the voltage rise caused by the inductances.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
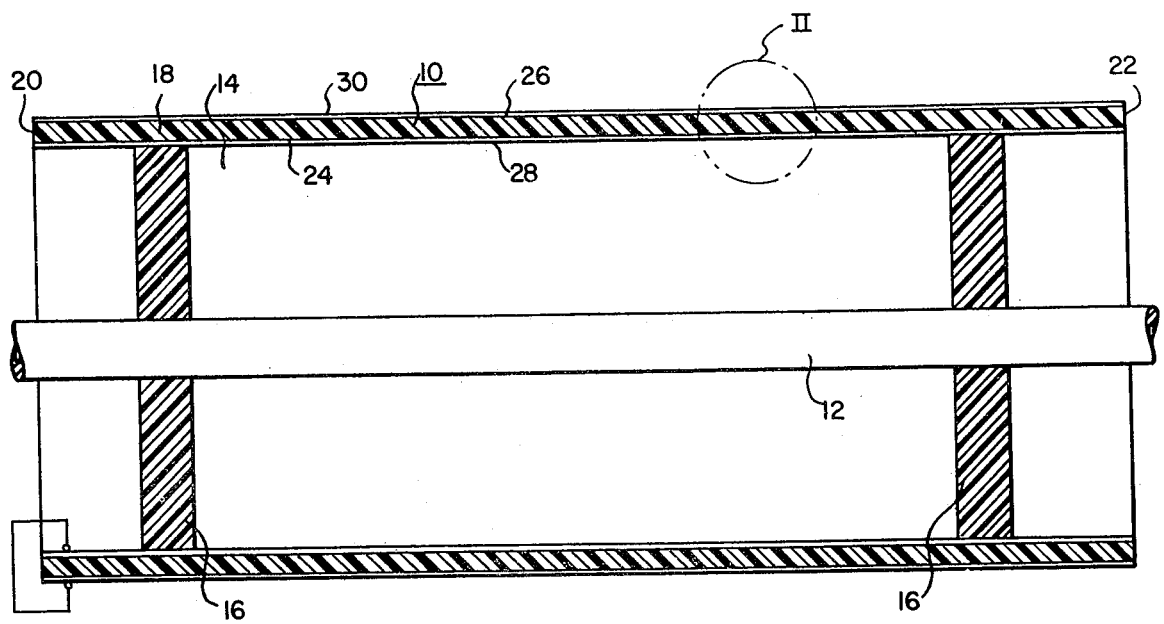
FIG. 1 is an elevational view of a gas insulated transmission line of this invention.

Referring now more particularly to FIG. 1, therein is shown a gas insulated transmission line utilizing the teachings of this invention. The transmission line includes an outer sheath 10, an inner conductor 12 disposed within the outer sheath 10, and an insulating gas 14 such as sulfur hexafluoride or $SF_6$, disposed within the outer sheath 10 between the outer sheath 10 and the inner conductor 12. The insulating gas 14 functions to electrically insulate the high electric potential inner conductor 12 from the ground outer sheath 10. Also disposed within the outer sheath 10 are insulating spacers 16 which support and center the inner conductor 12 within the outer sheath 10.

The outer sheath 10 comprises an insulating tube 18 which has first and second ends 20 and 22, respectively, an interior surface 24, and an exterior surface 26. Secured to the interior surface 24 of the insulating tube 18 is a first electrically conducting foil 28 of a material such as aluminum, copper, or stainless steel. Secured to the exterior surface 26 of the insulating tube 18 is a second electrically conducting foil 30, again of a material such as aluminum, copper, or stainless steel. Means 29 for electrically connecting the first and second foils 28, 30 illustrated as being a wire, may be utilized for increasing the effectiveness of the apparatus. Although not illustrated, similar connecting means may be utilized at the second end 22 or at any intermediate location along the outer sheath 10. As a point of reference, the two foils 28 and 30 would have a thickness typically of 0.015 inches (0.0381 cm). The insulating tube 18 is typically of a non-metallic material such as polyethylene or fiberglass. Although not illustrated, it is to be understood that the two foils 30 and 28, could both be secured to the interior surface of the tube 18, as long as an insulating layer is maintained between the two foils 28, 30. The foil 30 could be secured to the tube 18 through the foil 28 and, for example, an adhesive layer.

Figure 2:
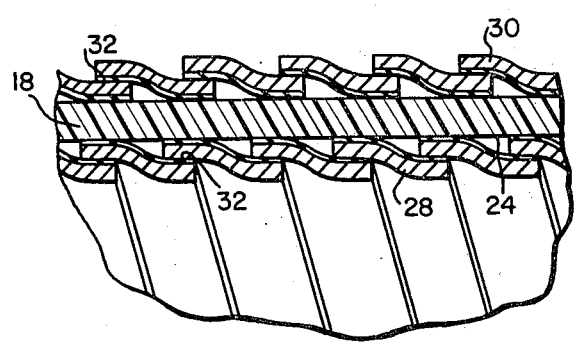
FIG. 2 is an enlarged view of a portion of the outer sheath of the line of FIG. 1.

Referring now to FIG. 2, therein is shown an enlarged view of a portion of the outer sheath 10 of FIG. 1. The section illustrates the insulating tube 18, the first electrically conducting foil 28, and the second electrically conducting foil 30. The first foil 28 secured to the interior surface 24 of the insulating tube 18 is spirally wound from the second tube end 22 to the first tube end 20. By this, it is meant that the plurality of turns present within the spiral winding occurs so that each succeeding layer travels from end 22 to end 20. The second foil 30 is also spirally wound. However, the second foil 30 is spirally wound in the direction from the first end 20 to the second end 22. In other words, the two foils 28 and 30 are spirally wound in opposite directions. By so winding the foils, the inductances present within the foils effectively cancel each other out, thereby minimizing any voltage rises caused by the inductances.

Also shown in FIG. 2 is an insulating layer 32 disposed between the portions of both the first 28 and second 30 foils where they overlap, if they are so wound. The insulating layer 32 may, for example, be an insulating adhesive which is disposed on the foils 28 and 30. The insulating layer 32 also could comprise insulation positioned in any other manner between the adjacent turns.

It would be appreciated by one skilled in the art that the use of such oppositely wound foils achieves cost reductions by maximizing the length between adjacent grounds while not increasing the cost of manufacture. The use of the intercalated sheath reduces the cost of the sheath from that which would occur if the outer sheath were of solid aluminum, while the opposite winding of the two foils does not increase cost. The cost of winding the foils is the same irregardless of which direction they are wound, so that teachings of this invention do not increase cost manufacture. Also, although illustrated as having two foils, the invention is applicable to intercalated sheaths having a plurality of foils, each being insulated from each other. Thus, it can be seen that this invention provides a gas insulated transmission line which is economical and which increases the distance between required ground connections.

I claim as my invention:

1. A gas insulated transmission line comprising:
   an elongated cylindrical outer sheath having a radial inner radius;
   an elongated, cylindrical inner conductor disposed within said outer sheath, said inner conductor having a radial outer radius;
   an insulating gas disposed within said outer sheath, said insulating gas electrically insulating said inner conductor from said outer sheath; and
   at least one spacer assembly disposed within said outer sheath, said spacer assembly insulatably supporting said inner conductor within said outer sheath, said spacer assembly comprising:
   a first member having a radial shape defined along its radial extremities by an inner radius substantially the same as said inner conductor outer radius and by an outer radius being substantially the same as said outer sheath inner radius, said first member along its inner radial extremity extending for an arc distance of 180°, said first member being disposed intermediate said inner conductor and said outer sheath, said first member inner radial extremity being positioned adjacent said inner conductor, said first member having a pair of cavities therein extending inwardly from said outer radial extremity;
   a second member having a radial shape defined along its radial extremities by an inner radius substantially the same as said inner conductor outer radius and by an outer radius less than said outer sheath inner radius, said second member being disposed intermediate said inner conductor and said outer sheath, said second member inner radial extremity extending for an arc distance of 180° and being positioned adjacent said inner conductor, said first and second member outer radial extremities together extending for an arc distance of 360°; and
   a curved plate having inner and outer radial extremities defined by an inner radius substantially the same as said second member outer radius and by an outer radius substantially the same as said outer sheath inner radius, said plate being positioned intermediate said second memer and said outer sheath, said plate having an inwardly projecting nub at each circumferential end thereof, said plate circumferentially extending beyond said second member outer radial extremity to said first member cavities such that said nubs are disposed within said first member cavities, said plate securing said first member to said second member.

2. The transmission line according to claim 1, including an insulating layer disposed between overlapping turns of said first and second foils.

3. The transmission line according to claim 2, wherein said insulating layer is an insulating adhesive disposed on said first and second foils.

4. The transmission line according to claim 1, wherein said first and second foils are of aluminum.

5. The transmission line according to claim 4, wherein said first and second foils each have a thickness substantially equal to 0.015 inches.

6. The transmission line according to claim 1, wherein said insulating tube is of a material comprising polyethylene.

7. The transmission line according to claim 1, wherein said insulating tube is of a material comprising fiberglass.

8. A gas insulated transmission line including an outer sheath, an inner conductor disposed within said outer sheath, and an insulating gas disposed intermediate said inner conductor and said outer sheath, said outer sheath comprising:
   an insulating tube having first and second ends and having interior and exterior surfaces;
   a first electrically conducting foil secured to the interior surface of said insulating tube, said first foil being spirally wound from said first tube end to said second tube end and having a plurality of turns;
   a second electrically conducting foil secured to said insulating tube, said second foil being spirally wound from said second tube end to said first tube end and having a plurality of turns; said second electrically conducting foil being electrically insulated from said first foil; and
   means for electrically connecting said first and second foils.

* * * * *

UNITED STATES PATENT AND TRADEMARK OFFICE
CERTIFICATE OF CORRECTION

PATENT NO. : 4,095,040

DATED : June 13, 1978

INVENTOR(S) : Alan H. Cookson

It is certified that error appears in the above-identified patent and that said Letters Patent are hereby corrected as shown below:

Column 3, line 28, cancel beginning with "1. A gas insulated transmission line comprising:" to and including "member to said second member." in column 4, line 19, and insert the following claim:

-- 1. A gas insulated transmission line including an outer sheath, an inner conductor disposed within said outer sheath, and an insulating gas disposed intermediate said inner conductor and said outer sheath, said outer sheath comprising:

an insulating tube having first and second ends and having interior and exterior surfaces;

a first electrically conducting foil secured to the interior surface of said insulating tube, said first foil being spirally wound from said first tube end to said second tube end and having a plurality of turns;

a second electrically conducting foil secured to the exterior surface of said insulating tube, said second foil being spirally wound from said second tube end to said first tube end and having a plurality of turns; and

UNITED STATES PATENT AND TRADEMARK OFFICE
CERTIFICATE OF CORRECTION

PATENT NO. : 4,095,040                                Page 2 of 2
DATED      : June 13, 1978
INVENTOR(S) : Alan H. Cookson It is certified that error appears in the above—identified patent and that said Letters Patent are hereby corrected as shown below:

means for electrically connecting said first and second foils. --.

*Signed and Sealed this*

*Fourteenth* Day of *November 1978*

[SEAL]

Attest:

RUTH C. MASON
*Attesting Officer*

DONALD W. BANNER
*Commissioner of Patents and Trademarks*